UNITED STATES PATENT OFFICE.

FREDERICK ALFRED LALLEMAND, OF MONTREAL, QUEBEC, CANADA, ASSIGNOR TO ALBERTINA LAURENDEAU LALLEMAND, OF MONTREAL, CANADA.

SHORTENING COMPOSITION.

No. 852,966.

Specification of Letters Patent.

Patented May 7, 1907.

Application filed April 28, 1905. Serial No. 257,921.

*To all whom it may concern:*

Be it known that I, FREDERICK ALFRED LALLEMAND, of the city of Montreal, Province of Quebec, Canada, have invented certain new and useful Improvements in Shortening Compositions; and I do hereby declare that the following is a full, clear, and exact description of the same.

This invention relates to compounds which can be used as substitutes for any of the well known shortenings such as cottolene, lard, etc. employed in the making of pastry, biscuits, crackers, and the like, and its object is to produce a substitute compound of improved appearance and quality and which shall be of a substantially semi-solid form so that it can be handled in the same manner as cottolene, compound lard, or lard.

The invention consists in partially saponifying animal fats, or oils, or any animal fatty substance that will saponify, in such a manner that the resulting compound, either in a liquid or a more solid condition such as that of lard, is a most desirable substitute as a shortening for the substances mentioned.

In carrying out my invention, it is possible to use grease, fat, or animal oils of any kind that will saponify and different saponifying agents, although oils having a tendency to solidify upon cooling, such as melted tallow or other fats are to be preferred, and a saponifying agent that will have practically no other effect than that of rapid saponification, as is the case with a weak solution of lime, and an alkali carbonate, or bi-carbonate in water.

To produce the best shortening I use approximately 100 pounds of animal fat, preferably tallow (softened if necessary by oil) 60 pounds of water; 13 ounces of lime (calcium oxid); 20 ounces of bicarbonate of sodium, and proceed as follows:—I reduce the fat by heating to a transparent oil free from sediment, prepare a solution of lime and water by placing in a suitable vessel the requisite amount of lime and introduce first a quantity of water sufficient to disintegrate the body of lime and so, upon adding the remainder of the full quantity of water, the desired mixture is obtained, after which I add to this mixture the necessary quantity of bicarbonate of sodium. Having thus prepared the fatty animal oil and the saponifying agent, I stir the saponifying agent so as to eliminate all sediment and then mix and stir the oil and saponifier together until the whole reaches a semi-liquid consistency, the mixture being kept hot until the desired partial saponification is effected. After cooling for about 48 hours, the composition hardens to about the consistency of lard and can be handled in the same manner.

It will of course be understood that with different animal fatty substances it may be necessary to add to or diminish to some extent the quantity of water and saponifying agent and I therefore do not intend to limit myself to the precise proportions set forth in the example given. Should it be desired, however, to use the saponified compound as a shortening in liquid form in sweeter confections a small quantity of milk and sugar is added which prevents the solidification of the mass upon cooling and imparts a more palatable taste:

What I claim is as follows:—

1. A shortening composition consisting of a cooled emulsion formed from a large amount of animal fat saponified in small part by lime and an alkali, and water to at least 40% of the fat to make it into a compound of a semi-solid consistency.

2. A shortening composition consisting of a cooled emulsion formed from a large amount of animal fat saponified in small part by lime and soda and water to at least 40% of the fat to make it into a compound of a semi-solid consistency.

3. A shortening composition consisting of a cooled emulsion formed of animal fat, lime, bicarbonate of sodium and water to at least 40% of the fat producing a compound of a semi-solid consistency.

4. A shortening composition consisting of a cooled emulsion formed from a large amount of animal fat saponified in small part by an alkali, and water to at least 40% of the fat to make it into a compound of a semi-solid consistency.

5. A shortening composition consisting of a cooled emulsion formed of approximately 100 parts of animal fat, 60 parts of water and 2 parts of a saponifying agent, thoroughly mixed and incorporated together, substantially as set forth.

6. A shortening composition consisting of a cooled emulsion formed of approximately 100 parts of animal fat, 60 parts of water and sufficient of a saponifying agent to saponify said fat in small part and emulsify the whole, substantially as set forth.

In testimony whereof, I have signed my name to this specification, in the presence of two subscribing witnesses.

FREDERICK ALFRED LALLEMAND.

Witnesses:
  FRED J. SEARS,
  ARTHUR H. EVANS.